(12) United States Patent
Bonk

(10) Patent No.: US 11,117,537 B2
(45) Date of Patent: Sep. 14, 2021

(54) BACKREST OF A VEHICLE SEAT

(71) Applicant: Faurecia Automotive Seating, LLC, Auburn Hills, MI (US)

(72) Inventor: Jeffery T. Bonk, Chesterfield, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 105 days.

(21) Appl. No.: 16/357,657

(22) Filed: Mar. 19, 2019

(65) Prior Publication Data

US 2020/0298784 A1 Sep. 24, 2020

(51) Int. Cl.
*B60R 21/055* (2006.01)
*B60N 2/803* (2018.01)
*B60R 21/04* (2006.01)
*B60R 21/00* (2006.01)

(52) U.S. Cl.
CPC ............ *B60R 21/055* (2013.01); *B60N 2/803* (2018.02); *B60R 2021/0011* (2013.01); *B60R 2021/0407* (2013.01)

(58) Field of Classification Search
CPC .... B60N 2/914; B60N 2/803; B60N 2/42709; B60N 2/4228; B60R 21/055; B60R 2021/0011; B60R 2021/0407
See application file for complete search history.

(56) References Cited

U.S. PATENT DOCUMENTS

| | | | | |
|---|---|---|---|---|
| 5,076,643 A * | 12/1991 | Colasanti | ................ | A47C 7/467 297/284.6 |
| 5,186,494 A * | 2/1993 | Shimose | ............... | B60N 2/4221 280/806 |
| 5,427,331 A * | 6/1995 | Stroud | ............... | B64D 11/0689 244/122 A |
| 5,558,398 A * | 9/1996 | Santos | ...................... | A47C 4/54 297/284.3 |
| 5,580,124 A * | 12/1996 | Dellanno | ................ | B60N 2/803 297/216.12 |
| 5,658,050 A * | 8/1997 | Lorbiecki | .................. | B62J 1/12 297/452.41 |
| 5,769,489 A * | 6/1998 | Dellanno | ................ | B60N 2/888 297/216.14 |
| 5,772,281 A | 6/1998 | Massara | | |
| 5,782,529 A * | 7/1998 | Miller, III | ............. | B60R 21/207 280/730.1 |
| 5,826,937 A * | 10/1998 | Massara | .................. | B60N 2/853 297/284.6 |
| 5,833,312 A | 11/1998 | Lenz | | |
| 5,884,968 A * | 3/1999 | Massara | ................... | B60N 2/80 297/216.12 |
| 6,189,969 B1* | 2/2001 | McLaughlin | .......... | B60N 2/888 297/216.14 |
| 6,203,105 B1* | 3/2001 | Rhodes, Jr. | ............... | A47C 4/54 297/284.6 |
| 6,273,810 B1* | 8/2001 | Rhodes, Jr. | ............... | A47C 4/54 454/120 |

(Continued)

FOREIGN PATENT DOCUMENTS

JP 2016215824 12/2016

*Primary Examiner* — Paul N Dickson
*Assistant Examiner* — Timothy Wilhelm
(74) *Attorney, Agent, or Firm* — Barnes & Thornburg LLP

(57) ABSTRACT

A vehicle seat for supporting an occupant in a vehicle. The vehicle seat includes a backrest and a headrest.

17 Claims, 3 Drawing Sheets

(56) References Cited

U.S. PATENT DOCUMENTS

| | | | | |
|---|---|---|---|---|
| 6,474,733 | B1* | 11/2002 | Heilig | B60N 2/888 297/216.12 |
| 6,715,788 | B2* | 4/2004 | Saiguchi | B60N 2/4221 280/730.1 |
| 6,746,078 | B2 | 6/2004 | Breed | |
| 6,805,404 | B1 | 10/2004 | Breed | |
| 6,820,930 | B2* | 11/2004 | Dellanno | B60N 2/0244 297/216.12 |
| 6,908,152 | B2* | 6/2005 | McMillen | B60N 2/66 297/284.4 |
| 7,090,292 | B2* | 8/2006 | Dellanno | B60N 2/42709 297/216.12 |
| 7,480,950 | B2* | 1/2009 | Feher | A47C 7/74 5/423 |
| 7,588,115 | B2 | 9/2009 | Breed | |
| 8,038,209 | B2* | 10/2011 | Marsden | B60N 2/286 297/216.11 |
| 8,534,703 | B1* | 9/2013 | Baldwin | B60N 2/888 280/730.2 |
| 9,211,824 | B2* | 12/2015 | Arant | B60N 2/0244 |
| 9,333,889 | B1* | 5/2016 | Cloutier | B60N 2/5642 |
| 9,415,713 | B2 | 8/2016 | Line | |
| 9,428,087 | B2* | 8/2016 | Adachi | B60N 2/64 |
| 9,527,417 | B2* | 12/2016 | Dry | B60N 2/665 |
| 9,579,998 | B2* | 2/2017 | Hall | A61H 9/0078 |
| 9,610,871 | B2* | 4/2017 | Yasuda | B60N 2/7094 |
| 9,707,870 | B2 | 7/2017 | Line | |
| 9,707,873 | B2 | 7/2017 | Line | |
| 9,713,974 | B2* | 7/2017 | Mussi | B60N 2/914 |
| 9,845,029 | B1* | 12/2017 | Dry | B60N 2/914 |
| 9,884,574 | B2* | 2/2018 | Mizoi | B60N 2/002 |
| 9,889,771 | B2* | 2/2018 | Ohno | B60R 21/207 |
| 9,937,836 | B2* | 4/2018 | Dry | B60N 2/6671 |
| 9,981,588 | B2* | 5/2018 | Dry | B60N 2/20 |
| 10,106,061 | B2* | 10/2018 | Dry | B60N 2/665 |
| 10,144,330 | B1* | 12/2018 | Leek | B60N 2/0244 |
| 10,220,754 | B2* | 3/2019 | Dry | B60N 2/914 |
| 10,232,814 | B2* | 3/2019 | Gandhi | B60N 2/914 |
| 10,384,565 | B2* | 8/2019 | Dhaini | B60N 2/66 |
| 10,525,854 | B2* | 1/2020 | Alexander | B60N 2/0232 |
| 10,583,758 | B2* | 3/2020 | Ohno | B60N 2/6673 |
| 10,632,866 | B2* | 4/2020 | Benson | B60N 2/1615 |
| 10,857,920 | B2* | 12/2020 | Morrow | B60N 2/643 |
| 2002/0060485 | A1 | 5/2002 | Fischer | |
| 2003/0038517 | A1* | 2/2003 | Moran | B60N 2/914 297/284.3 |
| 2005/0264052 | A1* | 12/2005 | Dellanno | B60N 2/42709 297/216.12 |
| 2008/0073951 | A1* | 3/2008 | Hattori | B60N 2/888 297/216.12 |
| 2014/0007761 | A1* | 1/2014 | Haidar | B60N 2/4415 89/36.02 |
| 2016/0325641 | A1* | 11/2016 | Ohno | B60R 21/207 |
| 2017/0008480 | A1* | 1/2017 | Ohno | B60N 2/99 |
| 2018/0178696 | A1* | 6/2018 | Dexter | B60N 2/809 |
| 2019/0031058 | A1* | 1/2019 | Boccuccia | B60N 2/0224 |

* cited by examiner

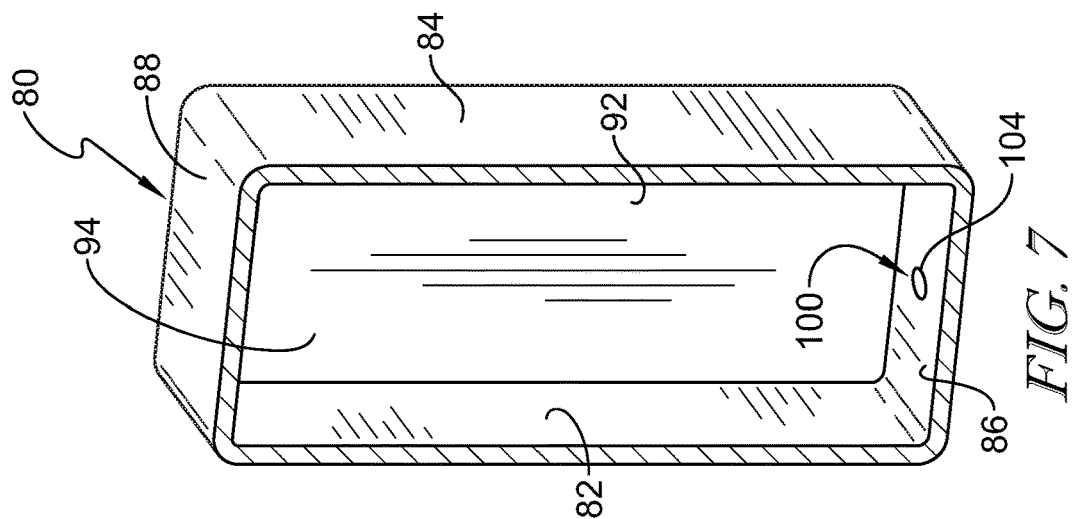
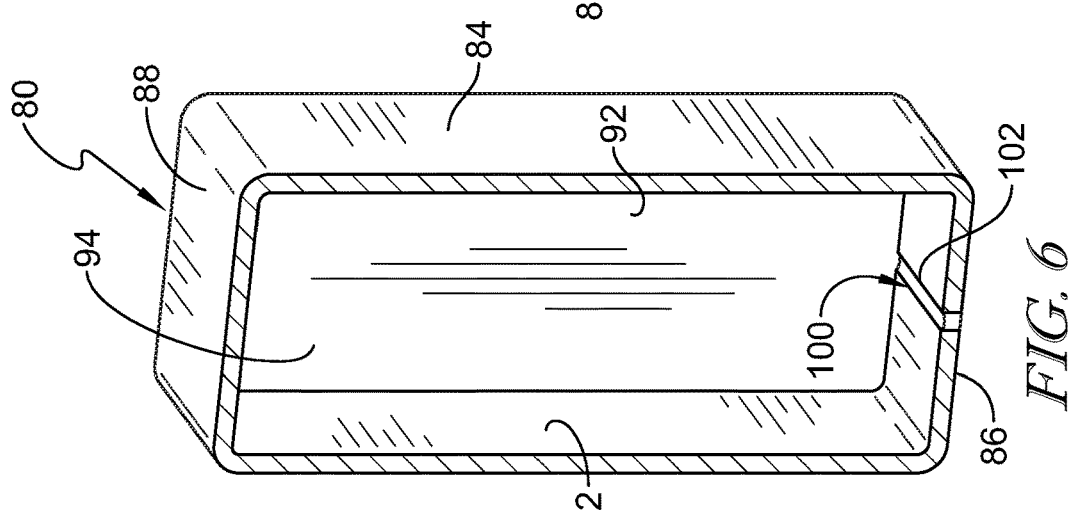
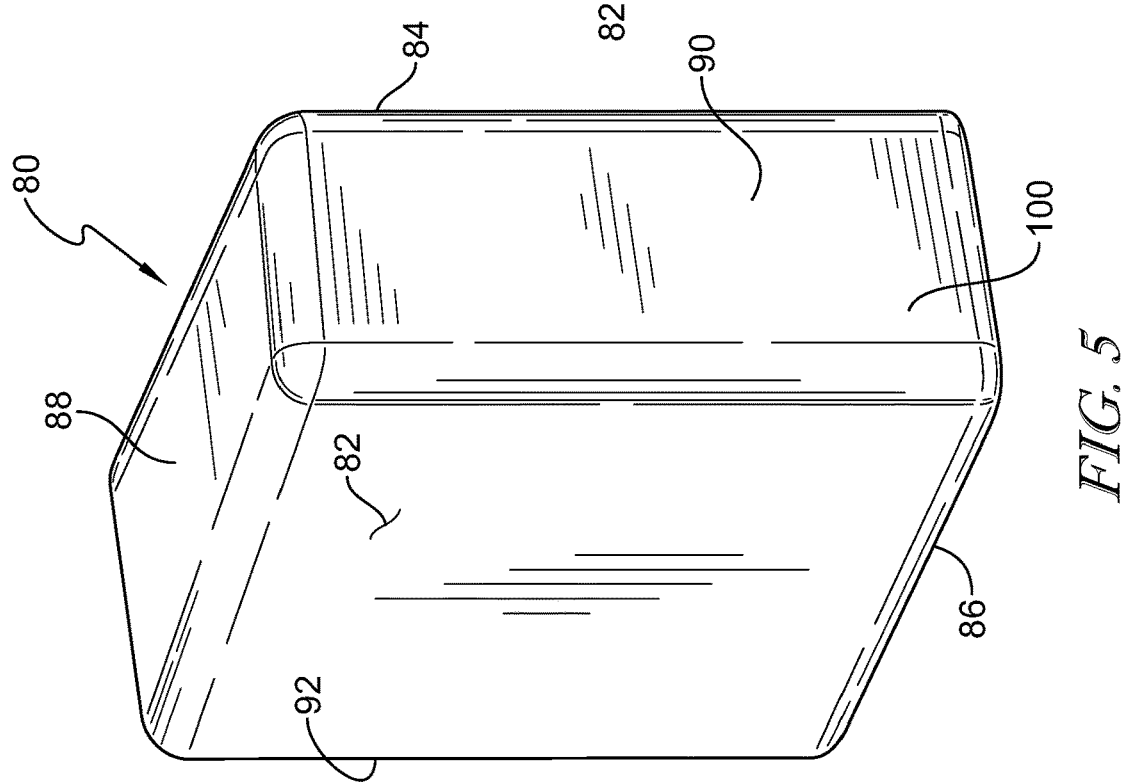

BACKREST OF A VEHICLE SEAT

BACKGROUND

The present disclosure relates to an occupant support, and particularly to an occupant support used in a vehicle. More particularly, the present disclosure relates to a backrest included in a vehicle seat.

SUMMARY

According to the present disclosure, a vehicle seat of a vehicle includes a seat bottom and a seat back coupled to the seat bottom to extend upwardly away from the seat bottom. The seat back includes a backrest and a headrest arranged to locate the backrest between the headrest and the seat bottom.

In illustrative embodiments, the backrest includes a collapsible member in an upper end of the backrest that is adapted to position the back end of a head of an occupant a comfortable distance away from a front surface of the headrest during normal seating conditions. The collapsible member, in response to a predetermined force, collapses causing the back end of the head of the occupant to move toward the headrest.

In the illustrative embodiments, the collapsible member is a bladder that includes an interior chamber filled with a gas. The bladder is adapted to deflate and collapse when a torso of the occupant is pressed rearwardly against the backrest when the vehicle receives a rear-end impact. The force with which the torso of the occupant is pressed rearwarldy into the front of the backrest compresses the bladder and vents gas from the bladder to thereby deflate and collapse the bladder. The collapsing of the bladder enables the torso and head of the occupant to conjointly move rearwardly toward the back of the backrest and toward the headrest to a favorable impact position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a side elevational view of a vehicle seat including a backrest and a headrest and showing an occupant seated in the vehicle seat in a normal seating position with the back end of the head of the user located a backset distance "X" from the front surface of the headrest during normal seating conditions;

FIG. 2 is a side elevational view of a vehicle seat including a backrest with a collapsible member in accordance with the present disclosure, and shown with an occupant seated in the vehicle seat in an improved normal seating position with the back end of the head of the occupant spaced a backset distance "Y" from the front surface of the headrest that is greater than the backset distance "X" of FIG. 1;

FIG. 5 is a perspective view of the collapsible member embodied as a bladder in the inflated and expanded condition;

FIG. 6 is a cross sectional view of another embodiment of the bladder shown with a frangible heat seal in the bottom wall of the bladder for venting gas outwardly from the bladder when the heat seal is ruptured in response to a rear-end impact; and FIG. 7 is a cross sectional view of a further embodiment of the bladder shown with a valve in the bottom wall of the bladder adapted to selectively vent gas outwardly from the bladder in response to a rear-end impact.

DETAILED DESCRIPTION

Figures 1, 2:
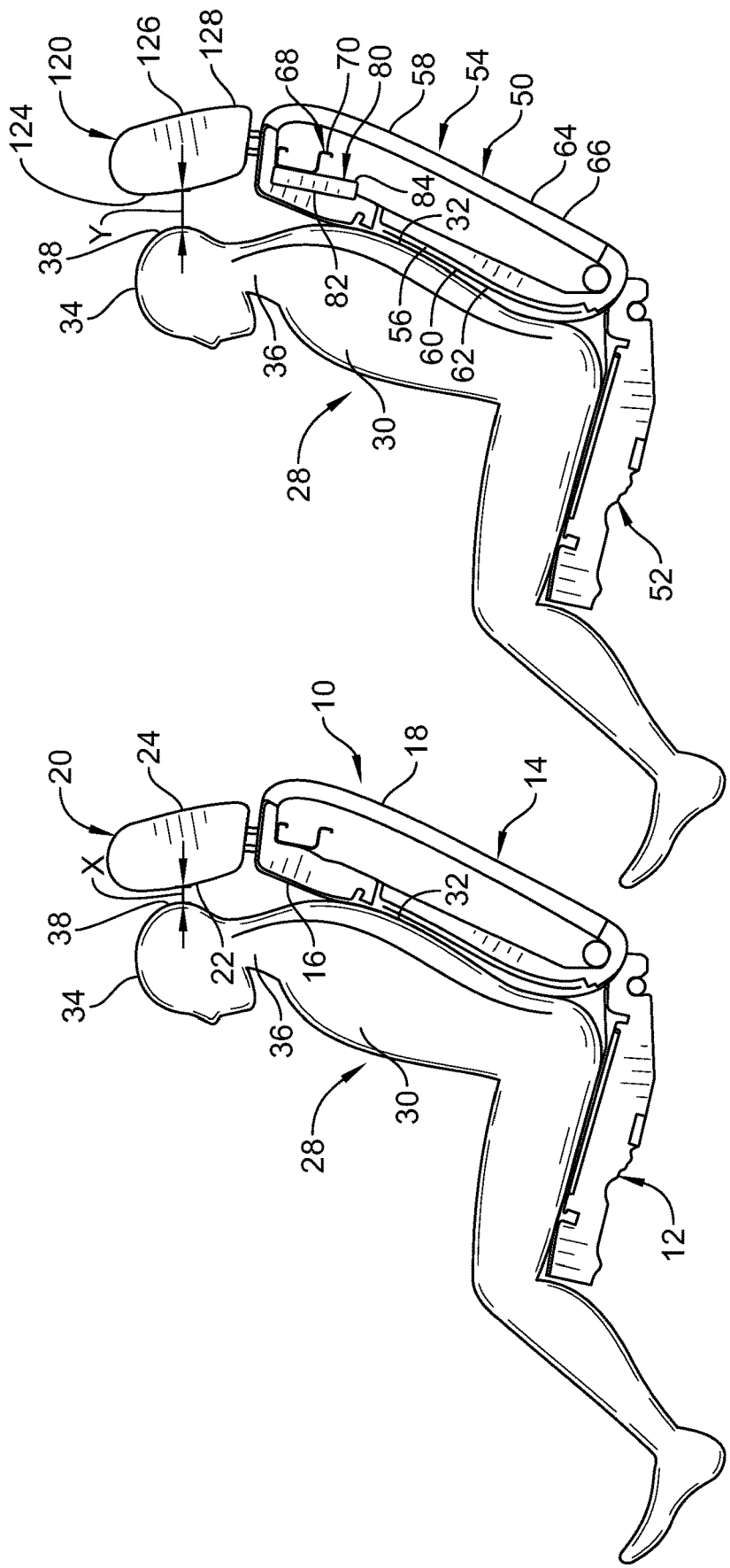

A vehicle seat 10 is shown in FIG. 1. Vehicle seat 10 includes a seat bottom 12 adapted to be connected to a floor of a vehicle. Vehicle seat 10 includes a backrest 14 connected at a bottom end to seat bottom 12. Backrest 14 includes a front 16, a back 18, and a headrest 20 connected to an upper end of backrest 14. Headrest 20 includes a front 22 and a back 24.

As shown in FIG. 1, an occupant 28 is in and supported by vehicle seat 10. Occupant 28 includes a torso 30 having a back 32. Occupant 28 also includes a head 34 connected to an upper end of torso 30 by a neck 36. Head 34 includes a face on one side and a back end 38 on the opposite side. As shown in FIG. 1, when occupant 28 is in a normal seating position in vehicle seat 10 during normal seating conditions, front 22 of headrest 20 is spaced apart from back end 38 of head 34 of occupant 28 by a backset distance "X."

Figure 4:
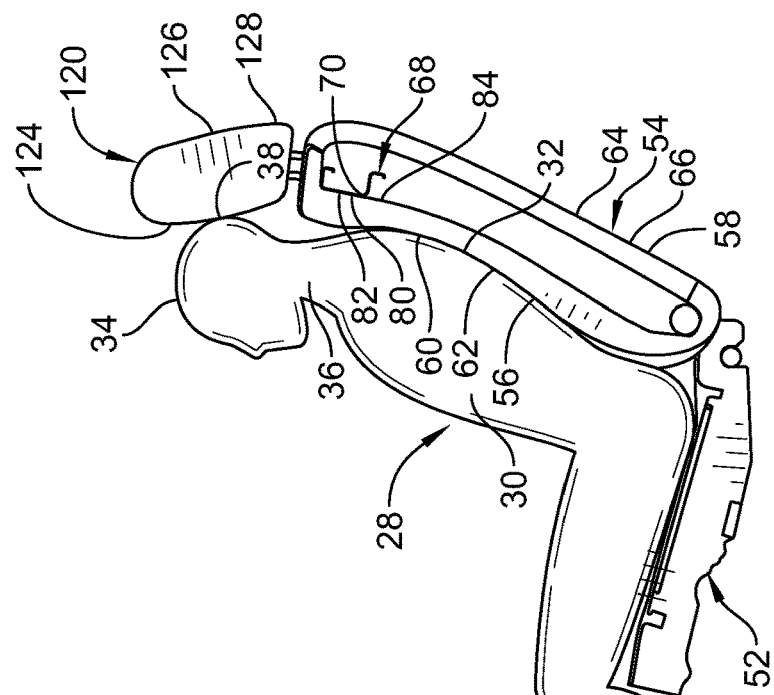
FIG. 4 shows the torso and head of the occupant pressed rearwardly into the front of the backrest and against the front surface of the headrest, with the collapsible member collapsed, in the favorable impact position after the vehicle receives a rear-end impact.
Figure 3:
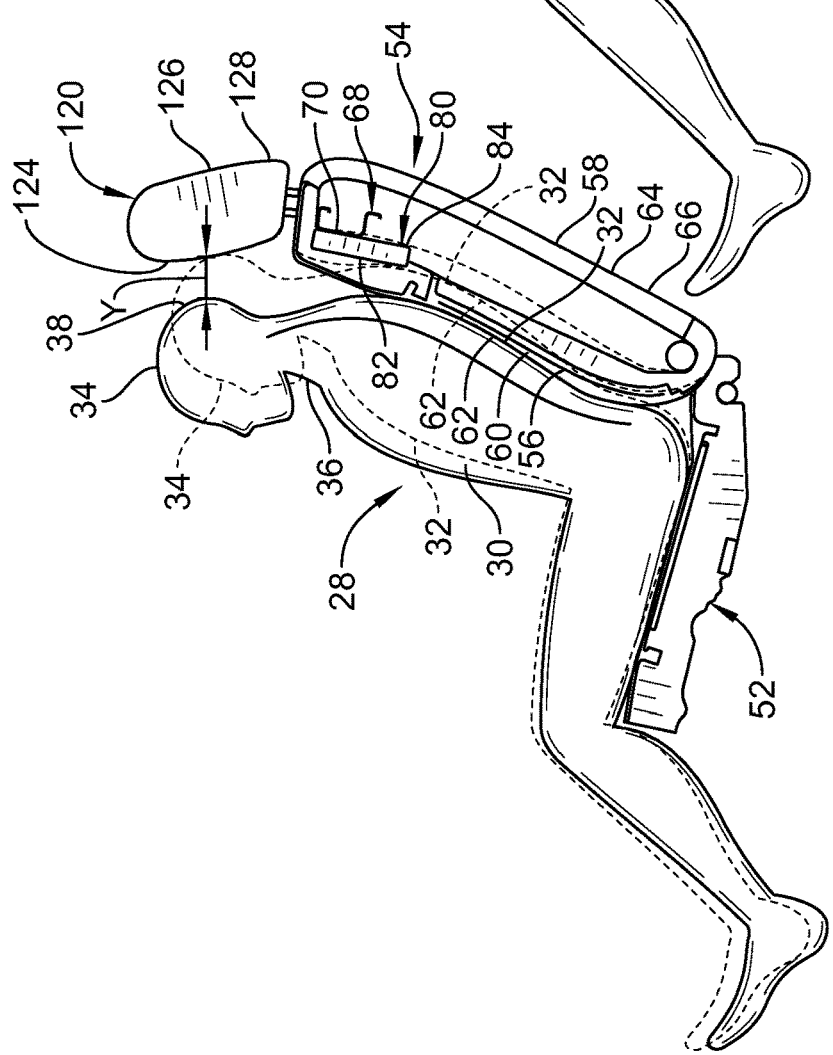
FIG. 3 is a side elevational view of the vehicle seat and occupant of FIG. 2 shown in solid lines in the improved normal seating position, and showing the location of the front surface of the backrest of the vehicle seat and the location of the occupant in dashed lines in a favorable impact position after the vehicle receives a rear-end impact.

An occupant support, such as a vehicle seat 50 is shown in FIGS. 2-4. Vehicle seat 50 includes a seat bottom 52 adapted to be connected to a floor of a vehicle. Vehicle seat 50 includes a seat back or backrest 54 connected at a bottom end to a rear end of seat bottom 52. Backrest 54 includes a front 56 and a back 58. Front 56 of backrest 54 includes a front skin 60 having a front surface 62. Back 58 of backrest 54 includes a rear skin 64 having a rear surface 66. Backrest 54 also includes a support frame 68 located in an interior of backrest 54 between front skin 60 and rear skin 64. Support frame 68 includes a support member 70 located within backrest 54 at an upper end of backrest 54. Backrest 54 includes a collapsible member 80 in the interior of backrest 54. Collapsible member 80 is located at an upper end of backrest 54 between support member 70 of support frame 68 and front skin 60 of front 56 of backrest 54.

As shown in FIGS. 2 and 5, collapsible member 80 may be a bladder 80. In another example, collapsible member 80 may be any suitable thermoformed part that collapses in response to application of a predetermined load.

Bladder 80 may be formed in the general shape of a rectangular parallelepiped. Bladder 80 includes a generally rectangular and planar front wall 82 and a spaced apart and generally parallel rectangular and planar rear wall 84. Bladder 80 includes a generally rectangular and planar bottom wall 86 that extends between bottom ends of front wall 82 and rear wall 84 generally perpendicular thereto. Bladder 80 includes a generally rectangular and planar top wall 88 spaced apart from and generally parallel to bottom wall 86. Top wall 88 extends between top ends of front wall 82 and rear wall 84 generally perpendicular to front wall 82 and rear wall 84. Bladder 80 includes a generally rectangular and planar left side wall 90 and a generally rectangular and planar right side wall 92 that is spaced apart from and generally parallel to left side wall 90. Left side wall 90 extends between a left ends of front wall 80, rear wall 84, bottom wall 86 and top wall 88 and is generally perpendicular thereto. Right side wall 92 extends between right ends of front wall 82, rear wall 84, bottom wall 86 and top wall 88 and is generally perpendicular thereto. Front wall 82 and rear wall 84 may be spaced apart from on another, for example, by approximately 20 millimeters (mm). Bottom wall 86 and top wall 88 may be spaced apart from one another, for example, by approximately 100 mm.

Bladder 80 includes a sealed hollow interior chamber 94 formed within front wall 82, rear wall 84, bottom wall 86, top wall 88, left side wall 90 and right side wall 92. Interior chamber 94 is adapted to receive and contain a volume of a gas, such as air. Bladder 80 may be formed from a plastic material such as, for example, thermal plastic polyurethane. Each of the front wall 82, rear wall 84, bottom wall 86, top wall 88, left side wall 90 and right side wall 92 of bladder 80 may be formed with a desired thickness to provide bladder 80 with a desired rupture strength.

Bladder 80 is selectively collapsible and deflatable from an expanded and inflated condition, as shown in FIG. 5, wherein a predetermined volume of gas is enclosed sealingly within interior chamber 94 of bladder 80, and a collapsed and deflated condition wherein gas within interior chamber 94 has been vented outwardly from bladder 80 as shown in FIG. 4. Front wall 82 of bladder 80 is spaced apart from rear wall 84 of bladder 80 when bladder is in the inflated and expanded condition. Bladder 80 includes a venting mechanism 100 that is adapted to vent gas from interior chamber 94 and outwardly from bladder 80 when a compressive force of a predetermined magnitude is applied to front wall 82 and rear wall 84 of bladder 80. When such a compressive force of predetermined magnitude is applied to front wall 82 and rear wall 84 of bladder 80, the pressure of the gas contained within interior chamber 94 increases, and venting mechanism 100 allows gas within interior chamber 94 to vent outwardly from bladder 80 such that front wall 82 and rear wall 84 may move closer together and potentially in engagement with one another, whereupon bladder 80 is in the collapsed and deflated condition.

Venting mechanism 100 may comprise one or more walls of bladder 80 that are designed with a selected rupture strength, such that one or more of the walls will selectively rupture when a selected predetermined compressive force is applied to bladder 80 and the pressure of the gas within bladder 80 increases sufficiently to rupture one or more walls of bladder 80, whereupon gas within interior chamber 94 is vented outwardly from bladder 80.

Another embodiment of collapsible bladder 80 is shown in FIG. 6, wherein venting mechanism 100 comprises a frangible heat seal 102 formed in bottom wall 86. Heat seal 102 is formed with a desired rupture strength, such that when a predetermined compressive force is applied to front wall 82 and rear wall 84 of bladder 80 to sufficiently increase the pressure of the gas within bladder 80, heat seal 102 breaks or ruptures, whereupon gas within interior chamber 94 is vented outwardly from bladder 80. Heat seal 102 may be formed in any wall or portion of bladder 80.

A further embodiment of bladder 80 is shown in FIG. 7, wherein venting mechanism 100 comprises a valve 104 located in bottom wall 86 of bladder 80. Valve 104 is adapted to vent or discharge gas within interior chamber 94 outwardly from bladder 80 when a predetermined compressive force is applied to front wall 82 and rear wall 84 of bladder 80 and the pressure of the gas within interior chamber 94 is increased to a desired magnitude wherein the valve 104 vents gas outwardly from interior chamber 94. Valve 104 may be located in any wall or portion of bladder 80.

In another example, bladder 80 may be substituted with a thermoformed member which collapses in response to a predetermined force being applied to the thermoformed member. In one example, the predetermined force is an impact event such a rear impact to the vehicle.

Vehicle seat 50, as shown in FIG. 2, also includes a headrest 120 coupled to an upper end of backrest 54. Headrest 120 includes a front end 122 having a front surface 124 and a rear end 126 having a rear surface 128. Front end 122 and front surface 124 are spaced apart from rear end 126 and rear surface 128. Headrest 120 may be coupled to support frame 68 of backrest 54.

Occupant 28 is seated in and supported by vehicle seat 50 as shown in FIG. 2, and as shown in solid lines in FIG. 3, in an improved seating position during normal seating conditions with bladder 80 in the inflated and expanded condition. Back 32 of torso 30 of occupant 28 is in engagement with and supported by front surface 62 of front skin 60 of front 56 of backrest 54. Back end 38 of head 34 of occupant 28 is spaced apart from front surface 124 of front end 122 of headrest 120 by a backset distance "Y", which is greater than the backset distance "X" as shown in FIG. 1. Backset distance "Y" may be greater than backset distance "X" by, for example, approximately 20 mm. The increased backset distance "Y" provides improved comfort to occupant 28 while seated in vehicle seat 50 against backrest 54 in the improved normal seating position during normal driving conditions.

When the vehicle in which occupant 28 is seated in vehicle seat 50 receives an impact force in the rear end of the vehicle, such as may be received in a rear-end impact or crash from another vehicle, torso 30 and head 34 of occupant 28 is forced rearwardly into backrest 54 and toward headrest 120. FIG. 3 generally illustrates the movement of torso 30 and head 34 of occupant 28 from the improved normal seating position, as shown in solid lines, to a rearwardly displaced favorable impact position, as shown in solid lines, resulting from a rear end impact to the vehicle in which occupant 28 is seated. The relocated favorable impact position of occupant 28 with respect to vehicle seat 50 due to a rear-end impact is also shown in FIG. 4.

When the vehicle in which occupant 28 is seated in vehicle seat 50 receives a rear-end impact force, torso 30 and head 34 of occupant 28 move conjointly with respect to one another from the improved normal seating position toward the rear of the vehicle, with the back 32 of torso 30 of occupant 28 being pressed into front surface 62 of front skin 60 of front 56 of backrest 54. The shoulder area of the upper end of torso 30 of occupant 28 presses front skin 60 of front 56 of back rest 54 rearwardly toward front wall 82 of bladder 80. Torso 30 of occupant 28 thereby compresses bladder 80 between support frame 68 and front skin 60 of front 56 of back rest 54 with a compressive force applied between front wall 82 and rear wall 84 of bladder 80. When the magnitude of the compressive force applied by the torso 30 of occupant 28 to bladder 80 reaches a predetermined magnitude, venting mechanism 100 vents gas outwardly from bladder 80 such that bladder 80 deflates and collapses, thereby allowing torso 30 of occupant 28 to conjointly move further rearwardly into backrest 54 of vehicle seat 50 to the favorable impact position as shown in FIG. 4 with bladder 80 in the deflated and collapsed condition. In one example, collapsible member 80 collapses or deflates from the inflated and expanded condition to the deflated and collapsed condition in about 70 milliseconds (ms) or less. In another example, collapsible member 80 changes from the expanded condition to the collapsed condition in about 35 milliseconds or less.

Although vehicle seat 50, with an increased headrest backset distance "Y", with bladder 80 in the inflated and expanded condition, provides increased headrest backset distance than the headrest backset distance of "X" of vehicle seat 10 as shown in FIG. 1, the deflation and collapsing of bladder 80 when the vehicle receives a rear-end impact force allows torso 30 and head 34 of occupant 28 to conjointly move rearwardly with respect to one another while torso 30 of occupant 28 is pressed rearwardly into vehicle seat 50, such that front surface 62 of front skin 60 is moved more closely toward rear surface 66 of rear skin 64 of backrest 54, as bladder 80 vents gas and collapses. The venting and collapsing of bladder 80 allows torso 30 and head 34 occupant 28 to move rearwardly with respect to support frame 68 conjointly with one another toward the favorable impact position, and substantially without any movement of head 34 with respect to torso 30, until back end 38 of head 34 engages front surface 124 of front end 122 of headrest 120, or at least until back end 38 of head 34 of occupant 28 is located a distance from front surface 124 of front end 122 of headrest 120 that is a distance approximately equal to or shorter than the backset headrest distance "X" of FIG. 1.

Backrest 54 with collapsible bladder 80 provides an increased backset headrest distance "Y" for comfort of occupant 28, while also minimizing the rearward movement of head 34 of occupant 28 with respect to torso 30 when the vehicle in which occupant 28 is seated receives a rear-end impact force. Backrest 54 with collapsible bladder 80 thereby avoids injury to occupant 28, such as injuries that may result from whiplash, when the vehicle in which occupant is seated receives a rear-end impact force.

The present disclosure relates to a backrest having a collapsible bladder for positioning an occupant in an improved normal seating position with respect to the vehicle seat and for repositioning the occupant to a favorable impact position with respect to the vehicle seat when the occupant is involved in a rear-end impact.

The invention claimed is:

1. A vehicle seat for supporting an occupant in a vehicle, the vehicle seat comprising:
   a backrest having a front surface adapted to support a torso of the occupant, a rear surface spaced apart from the front surface, and an interior located between the front surface and the rear surface;
   a headrest coupled to the backrest, the headrest adapted to engage a head of the occupant when the vehicle receives a rear-end impact; and
   a collapsible member in the interior of the backrest for supporting the torso of the occupant; the collapsible member having a top wall located below the headrest and a bottom wall located above a mid-point of the backrest;
   whereby when the vehicle receives a rear-end impact, the torso of the occupant is pressed against the front surface of the backrest increasing pressure within the collapsible member, whereupon the collapsible member collapses in response to the increased pressure from the occupant to cause the collapsible member to deflate allowing the torso and head of the occupant to conjointly move toward the back surface of the backrest and the headrest.

2. The vehicle seat of claim 1, wherein the collapsible member is a bladder having an interior chamber adapted to contain a volume of a gas and a venting mechanism for venting selectively gas from the chamber of the bladder and the venting mechanism vents gas from the bladder such that the bladder collapses in response to the torso of the occupant compressing the bladder during the rear-end impact.

3. The vehicle seat of claim 2, wherein the bladder includes a front wall and a spaced apart rear wall, the interior chamber being located between the front wall and the rear wall.

4. The vehicle seat of claim 2, wherein the bladder includes one or more walls, the venting mechanism being located in a wall of the bladder.

5. The vehicle seat of claim 2, wherein the venting mechanism comprises a heat seal formed in a wall of the bladder, the heat seal adapted to rupture and thereby allow the venting of gas from the bladder when a force is applied to the bladder.

6. The vehicle seat of claim 2, wherein the venting mechanism comprises a valve in fluid communication with the interior chamber of the bladder, the valve adapted to allow venting of gas from the bladder when a force is applied to the bladder.

7. The vehicle seat of claim 2, wherein the bladder includes a front wall, a rear wall spaced apart from the front wall, a bottom wall extending between the front wall and the rear wall, and a top wall extending between the front wall and the rear wall, the interior chamber of the bladder being located between the front wall, rear wall, bottom wall, and top wall.

8. The vehicle seat of claim 6, wherein the rear wall of the bladder is spaced apart from the front wall of the bladder by 20 mm.

9. The vehicle seat of claim 2, wherein the backrest includes a frame located in the interior of the backrest, the bladder being located between the frame and the front surface of the backrest.

10. The vehicle seat of claim 9, wherein the bladder is located at an upper end of the backrest.

11. The vehicle seat of claim 9, wherein the headrest is coupled to the frame of the backrest, such that the headrest remains stationary with respect to the frame when the vehicle receives a rear-end impact.

12. The vehicle seat of claim 2, wherein the bladder is formed from a plastic material.

13. The vehicle seat of claim 2, wherein the bladder is selectively collapsible from an expanded condition to a collapsed condition.

14. The vehicle seat of claim 13, wherein the bladder collapses from the expanded condition to the collapsed condition when a predetermined magnitude of force is applied to the bladder.

15. The vehicle seat of claim 14, wherein the bladder collapses in less than 70 milliseconds.

16. The vehicle seat of claim 15, wherein the bladder collapses in less than 35 milliseconds.

17. The vehicle seat of claim 1, wherein the bladder is formed from a flexible material.

* * * * *